US012777488B2

(12) United States Patent
Harada et al.

(10) Patent No.: US 12,777,488 B2
(45) Date of Patent: Oct. 27, 2026

(54) EFFICIENTLY SCHEDULING COMPONENT CARRIERS USING DOWNLINK CONTROL INFORMATION

(71) Applicant: NTT DOCOMO, INC., Tokyo (JP)

(72) Inventors: Hiroki Harada, Tokyo (JP); Shohei Yoshioka, Tokyo (JP); Shinya Kumagai, Tokyo (JP); Yuki Matsumura, Tokyo (JP); Yuki Takahashi, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 483 days.

(21) Appl. No.: 17/913,645

(22) PCT Filed: Mar. 23, 2020

(86) PCT No.: PCT/JP2020/012782
§ 371 (c)(1),
(2) Date: Sep. 22, 2022

(87) PCT Pub. No.: WO2021/191983
PCT Pub. Date: Sep. 30, 2021

(65) Prior Publication Data

US 2023/0102996 A1 Mar. 30, 2023

(51) Int. Cl.
*H04W 72/23* (2023.01)
*H04W 72/1263* (2023.01)

(52) U.S. Cl.
CPC ....... *H04W 72/23* (2023.01); *H04W 72/1263* (2013.01)

(58) Field of Classification Search
CPC ............. H04W 72/23; H04W 72/1263; H04W 72/232; H04L 5/001; H04L 5/0039;
(Continued)

(56) References Cited

U.S. PATENT DOCUMENTS

| | | | | |
|---|---|---|---|---|
| 10,701,679 | B2 * | 6/2020 | Vilaipornsawai | H04L 1/1819 |
| 2015/0092730 | A1 * | 4/2015 | Yang | H04W 72/0453 370/329 |

(Continued)

FOREIGN PATENT DOCUMENTS

| | | | |
|---|---|---|---|
| CN | 109152018 | A | 1/2019 |
| EP | 3817259 | A1 | 5/2021 |

(Continued)

OTHER PUBLICATIONS

Transmission Configuration Indicator State Activation Techniques for Carrier Aggregation, Qualcomm, Sep. 15, 2019, Jung Ho Ryu (Year: 2019).*

(Continued)

*Primary Examiner* — Ian N Moore
*Assistant Examiner* — Latresa A McCallum
(74) *Attorney, Agent, or Firm* — Osha Bergman Watanabe & Burton LLP

(57) ABSTRACT

A UE receives downlink control information from a network and schedules a plurality of component carriers using the downlink control information. The UE applies information of transmission configuration indication indicated by the downlink control information to the plurality of component carriers.

3 Claims, 8 Drawing Sheets

(58) Field of Classification Search
CPC ... H04L 5/0091; H04L 5/0023; H04L 5/0048; H04L 5/14
See application file for complete search history.

(56) References Cited

U.S. PATENT DOCUMENTS

| | | | | |
|---|---|---|---|---|
| 2015/0349940 | A1* | 12/2015 | Kim | H04L 5/005 370/329 |
| 2018/0092066 | A1* | 3/2018 | Marupaduga | H04B 7/14 |
| 2020/0008076 | A1 | 1/2020 | Peng et al. | |
| 2020/0052844 | A1* | 2/2020 | Yu | H04W 72/23 |
| 2020/0052869 | A1* | 2/2020 | Gheorghiu | H04L 5/0064 |
| 2021/0084625 | A1* | 3/2021 | Ryu | H04W 72/23 |
| 2021/0119741 | A1* | 4/2021 | Zhou | H04W 72/20 |
| 2022/0141857 | A1* | 5/2022 | Lee | H04W 72/23 370/329 |
| 2023/0085633 | A1* | 3/2023 | Zhou | H04L 5/0023 370/330 |
| 2023/0209543 | A1* | 6/2023 | Park | H04L 5/001 370/329 |

FOREIGN PATENT DOCUMENTS

| | | | |
|---|---|---|---|
| WO | 2020/003522 | A1 | 1/2020 |
| WO | 2020/033852 | A1 | 2/2020 |

OTHER PUBLICATIONS

Simultaneous TCI states Activation Method for Multiple BWPs; Park, Jonghyun, paragraphs 127, 136, 139 and 140 (Year: 2019).*

Beam Indication Reuse, Zhou, Yan, 3/29/209, paragraphs 127, 136, 139 and 140 (Year: 2019).*

International Search Report issued in PCT/JP2020/012782 on Nov. 2, 2020 (2 pages).

Written Opinion of the International Searching Authority issued in PCT/JP2020/012782 on Nov. 2, 2020 (3 pages).

Qualcomm; "New WID on Extending current NR operation to 71 GHz"; 3GPP TSG RAN Meeting #86, RP-193229; Sitges, Spain; Dec. 9-12, 2019 (5 pages).

Office Action issued in Chinese Application No. 202080098791.X, dated Aug. 24, 2024 (13 pages).

Qualcomm Incorporated: "Cross-Carrier Scheduling with Different Numerologies"; 3GPP TSG-RAN WG1 #97, R1-1907304; Reno, USA, May 13-17, 2019 (9 pages).

Office Action issued in counterpart Chinese Patent Application No. 202080098791.X mailed on Jan. 24, 2025 (23 pages).

* cited by examiner

EFFICIENTLY SCHEDULING COMPONENT CARRIERS USING DOWNLINK CONTROL INFORMATION

TECHNICAL FIELD

The present disclosure relates to a terminal that performs radio communication, and particularly to a terminal that performs radio communication using a plurality of component carriers.

BACKGROUND ART

The 3rd Generation Partnership Project (3GPP) has specified the 5th generation mobile communication system (5G) (also called New Radio (NR) or Next Generation (NG)), and has also advanced the next-generation specification called Beyond 5G, 5G Evolution, or 6G.

In Release 15 and Release 16 (NR) of the 3GPP, an operation of a band including a plurality of frequency ranges, specifically, FR1 (410 MHz to 7.125 GHz) and FR2 (24.25 GHz to 52.6 GHz) has been specified.

In addition, NR supporting 52.6 GHz to 71 GHz has also been studied (Non Patent Literature 1). Furthermore, Beyond 5G, 5G Evolution, or 6G (since Release-18) has aimed to support a frequency band exceeding 71 GHz.

CITATION LIST

Non Patent Literature

Non Patent Literature 1: "New WID on Extending current NR operation to 71 GHz", RP-193229, 3GPP TSG RAN Meeting #86, 3GPP, December 2019

SUMMARY OF INVENTION

It is assumed that when a usable frequency band is expanded as described above, a possibility that more component carriers (CCs) will be configured increases.

In carrier aggregation (CA), the number of CCs that can be configured is defined. For example, in Release 15 and Release 16 of the 3GPP, the maximum number of CCs that can be configured for a terminal (user equipment ((UE)) is sixteen in each of downlink (DL) and uplink (UL)

On the other hand, configuration of a physical layer and medium access control layer (MAC) is executed for each CC. For example, one downlink control information (DCI) can schedule only one CC, and thus, a large number of DCI is required to schedule a large number of CCs.

In particular, in a case of cross-carrier scheduling in which scheduling is applied across a plurality of CCs, there is a possibility that a capacity of a physical downlink control channel (PDCCH) used for transmission of the DCI will be tight.

Therefore, the following disclosure is made in view of such a situation, and an object of the following disclosure is to provide a terminal capable of realizing efficient scheduling of component carriers (CCs) using downlink control information (DCI) even in a case where a large number of CCs are configured.

An aspect of the present disclosure is a terminal (UE 200) including: a reception unit (control signal/reference signal processing unit 240) that receives downlink control information from a network; and a control unit (control unit 270) that schedules a plurality of component carriers using the downlink control information, in which the control unit applies information of transmission configuration indication indicated by the downlink control information to the plurality of component carriers.

DESCRIPTION OF EMBODIMENTS

Figure 1:
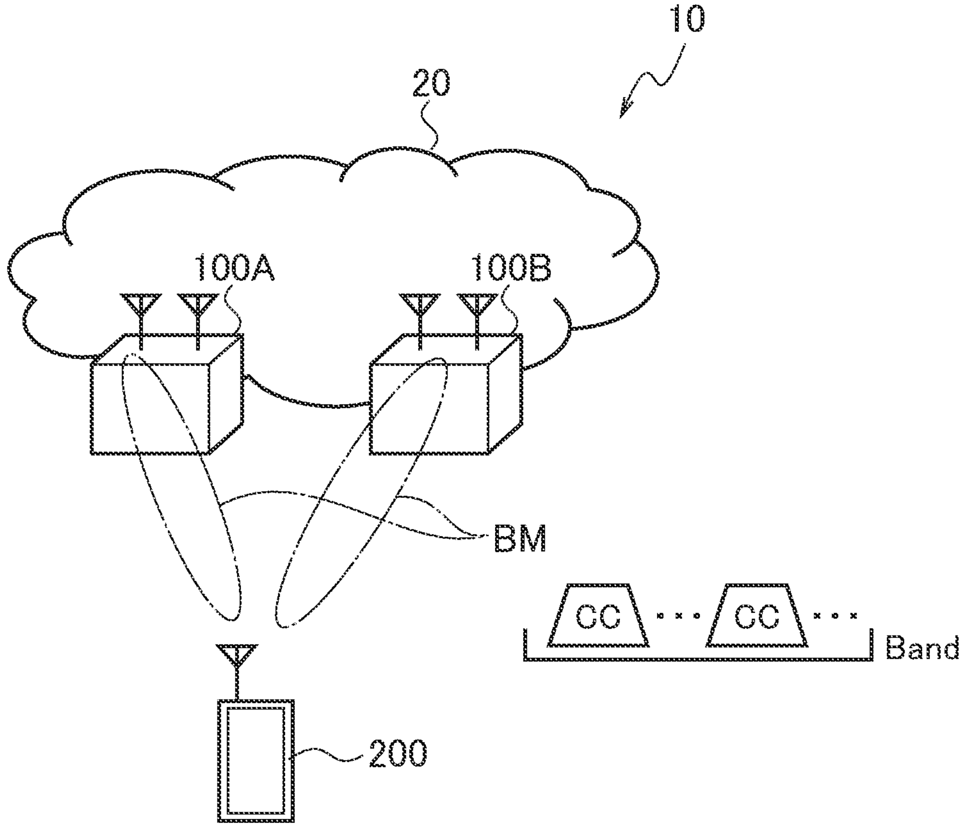
FIG. 1 is an overall schematic configuration diagram of a radio communication system 10.

Hereinafter, embodiments will be described with reference to the drawings. Note that the same functions or configurations will be denoted by the same or similar reference numerals, and a description thereof will be appropriately omitted.

(1) Overall Schematic Configuration of Radio Communication System

FIG. 1 is an overall schematic configuration diagram of a radio communication system 10 according to the present embodiment. The radio communication system 10 is a radio communication system according to 5G new radio (NR), and includes a next generation-radio access network 20 (hereinafter, referred to as NG-RAN 20) and a terminal 200 (hereinafter, referred to as UE 200).

The radio communication system 10 may be a radio communication system according to a system called Beyond 5G, 5G Evolution or 6G.

The NG-RAN 20 includes a radio base station 100A (hereinafter, referred to as gNB 100A) and a radio base station 100B (hereinafter, referred to as gNB 100B). Note that a specific configuration of the radio communication system 10 including the numbers of gNBs and UEs is not limited to an example illustrated in FIG. 1.

The NG-RAN 20 actually includes a plurality of NG-RAN nodes, specifically, gNBs (or ng-eNBs), and is connected to a core network (5GC) (not illustrated) according to 5G. Note that the NG-RAN 20 and the 5GC may be simply expressed as "networks".

The gNB 100A and the gNB 100B are radio base stations according to 5G, and execute radio communication according to 5G with the UE 200. The gNB 100A, the gNB 100B, and the UE 200 can support massive multiple-input multiple-output (MIMO) that generates beams BM with higher directivity, carrier aggregation (CA) that bundles and uses a plurality of component carriers (CCs), dual connectivity (DC) that simultaneously performs communication between the UE and each of two NG-RAN nodes, and the like, by controlling radio signals transmitted from a plurality of antenna elements.

Figure 2:
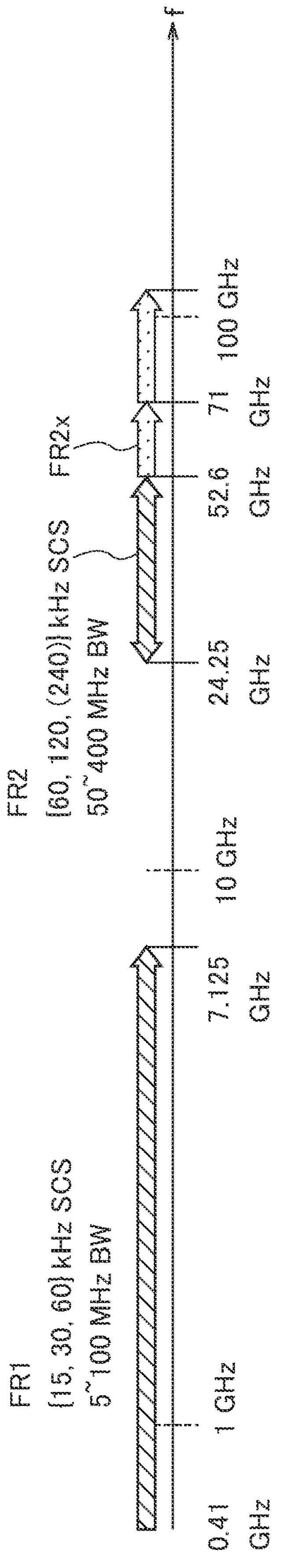
FIG. 2 is a diagram illustrating a frequency range used in the radio communication system 10.

In addition, the radio communication system 10 supports a plurality of frequency ranges (FRs). FIG. 2 illustrates frequency ranges used in the radio communication system 10.

As illustrated in FIG. 2, the radio communication system 10 supports FR1 and FR2. Frequency bands of each FR are as follows.

FR1:410 MHz to 7.125 GHz

FR2:24.25 GHz to 52.6 GHz

In FR1, a sub-carrier spacing (SCS) of 15, 30, or 60 kHz may be used and a bandwidth (BW) of 5 to 100 MHz may be used. FR2 has a higher frequency than FR1, and in FR2, an SCS of 60 or 120 kHz (240 kHz may be included) may be used and a bandwidth (BW) of 50 to 400 MHz may be used.

Note that the SCS may be interpreted as a numerology. The numerology is defined in 3GPP TS38.300, and corresponds to one subcarrier spacing in a frequency domain.

Furthermore, the radio communication system 10 also supports a higher frequency band than a frequency band of FR2. Specifically, the radio communication system 10 supports a frequency band exceeding 52.6 GHz and up to 71 GHz. Such a high frequency band may be called "FR2x" for convenience.

In order to solve such a problem, in a case of using a band exceeding 52.6 GHz, cyclic prefix-orthogonal frequency division multiplexing (CP-OFDM)/discrete Fourier transform-spread (DFT-S-OFDM) having a larger sub-carrier spacing (SCS) may be applied.

Figure 3:
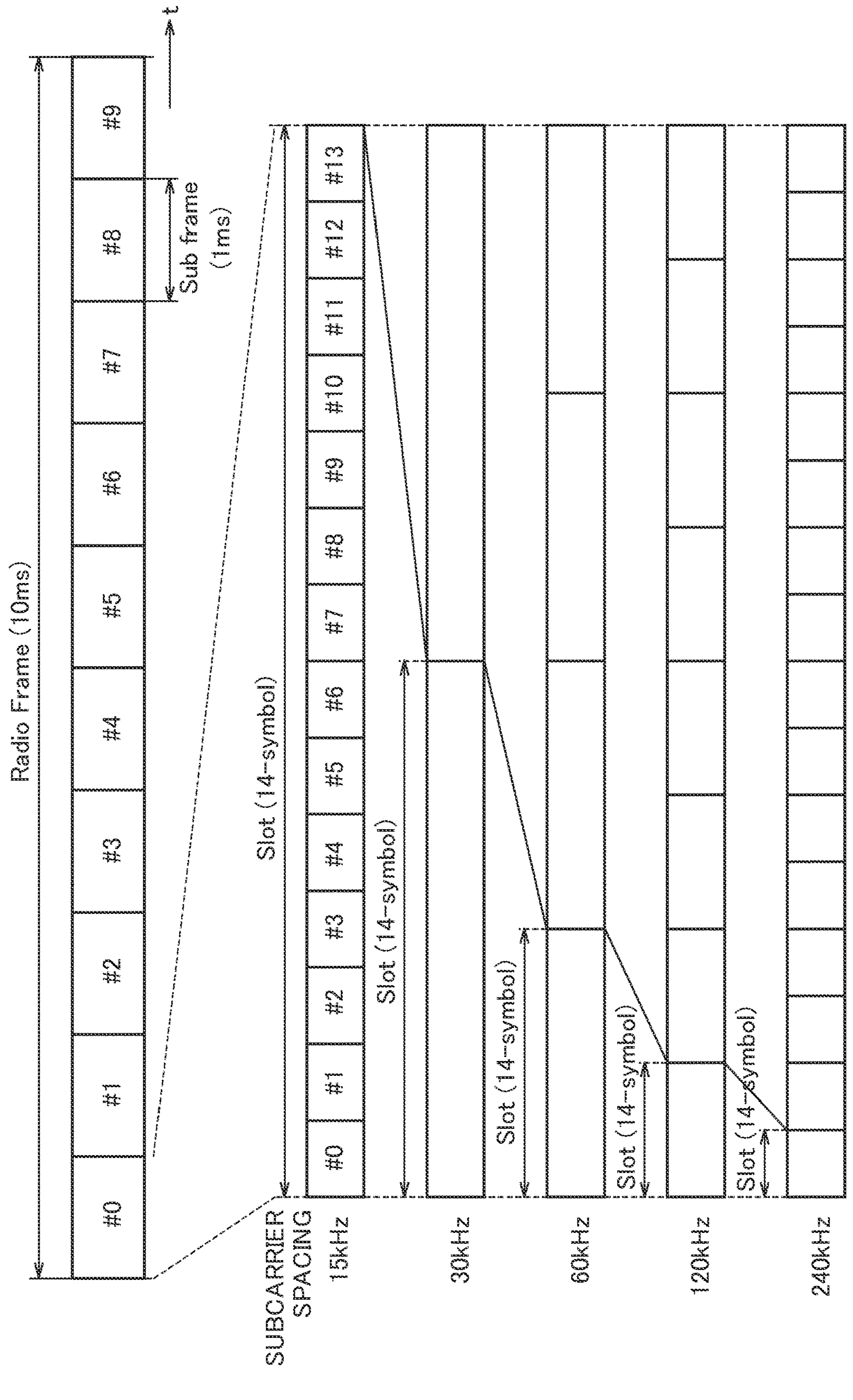
FIG. 3 is a diagram illustrating a configuration example of a radio frame, a subframe, and a slot used in the radio communication system 10.

FIG. 3 illustrates a configuration example of a radio frame, a subframe, and a slot used in the radio communication system 10.

As illustrated in FIG. 3, one slot is configured with 14 symbols, and the larger (wider) the SCS, the shorter the symbol period (and the slot period). The SCS is not limited to a spacing (frequency) illustrated in FIG. 3. For example, 480 kHz, 960 kHz or the like may be used.

In addition, the number of symbols configuring one slot may not be necessarily 14 symbols (for example, 28 or 56 symbols). Further, the number of slots per subframe may vary depending on the SCS.

Note that a time direction t illustrated in FIG. 3 may be called a time domain, a symbol period, a symbol time, or the like. In addition, a frequency direction may be called a frequency domain, a resource block, a subcarrier, a bandwidth part (BWP), or the like.

The BWP may be interpreted as a contiguous set of physical resource blocks (PRBs) selected from a contiguous subset of common resource blocks for a given numerology on a given carrier.

BWP information (a bandwidth, a frequency position, and a subcarrier spacing (SCS)) that the UE 200 is to use for radio communication can be configured in the UE 200 by using higher layer signaling (for example, radio resource control layer (RRC) singling). A different BWP may be configured for each UE 200 (terminal). The BWP may be changed by higher layer signaling or lower layer, specifically, physical layer (L1) signaling (such as downlink control information (DCI) to be described later).

In the radio communication system 10, a large number of CCs for CA may be supported to achieve a higher throughput. For example, in a case where a maximum bandwidth of the CC is 400 MHz, CCs up to 32 CCs can be arranged in FR2x, specifically, a frequency band of 57 GHz to 71 GHz. Note that the maximum number of CCs to be configured may exceed 32 or may be equal to or less than 32.

Furthermore, in the radio communication system 10, switching of transmission configuration indication (TCI) states of a plurality of CCs may be supported via one downlink control information (DCI). That is, in the radio communication system 10, the plurality of CCs can be scheduled using single DCI. Note that a detail of the TCI switching using the single DCI will further be described later.

The TCI may be defined by a higher layer parameter (for example, a field of tci-PresentInDCI). tci-PresentInDCI may indicate whether or not a TCI field exists in DL-related DCI. In a case where the TCI field does not exist, the UE 200 may consider that the TCI does not exist or is invalid.

In a case of cross-carrier scheduling, the network can validly configure the TCI field for control resource sets (CORESET) used for cross-carrier scheduling in a scheduling cell. The TCI provides, for example, information regarding quasi co-location (QCL) of an antenna port for a physical downlink control channel (PDCCH).

The QCL may be interpreted as considering that two antenna ports are quasi co-located, for example, in a case where characteristics of a channel carrying a symbol on one antenna port can be estimated from a channel carrying a symbol on the other antenna port.

In addition, the DCI may include the following information.

(i) Uplink (UL) resource allocation (persistent or non-persistent)

(ii) Description of downlink (DL) data transmitted to UE 200

The DCI may be interpreted as a set of information that can schedule a downlink data channel (for example, a physical downlink shared channel (PDSCH)) or an uplink data channel (for example, a physical uplink shared channel (PUSCH)). Such DCI may be particularly called scheduling DCI.

(2) Functional Block Configuration of Radio Communication System

Next, a functional block configuration of the radio communication system 10 will be described. Specifically, a functional block configuration of the UE 200 will be described.

Figure 4:
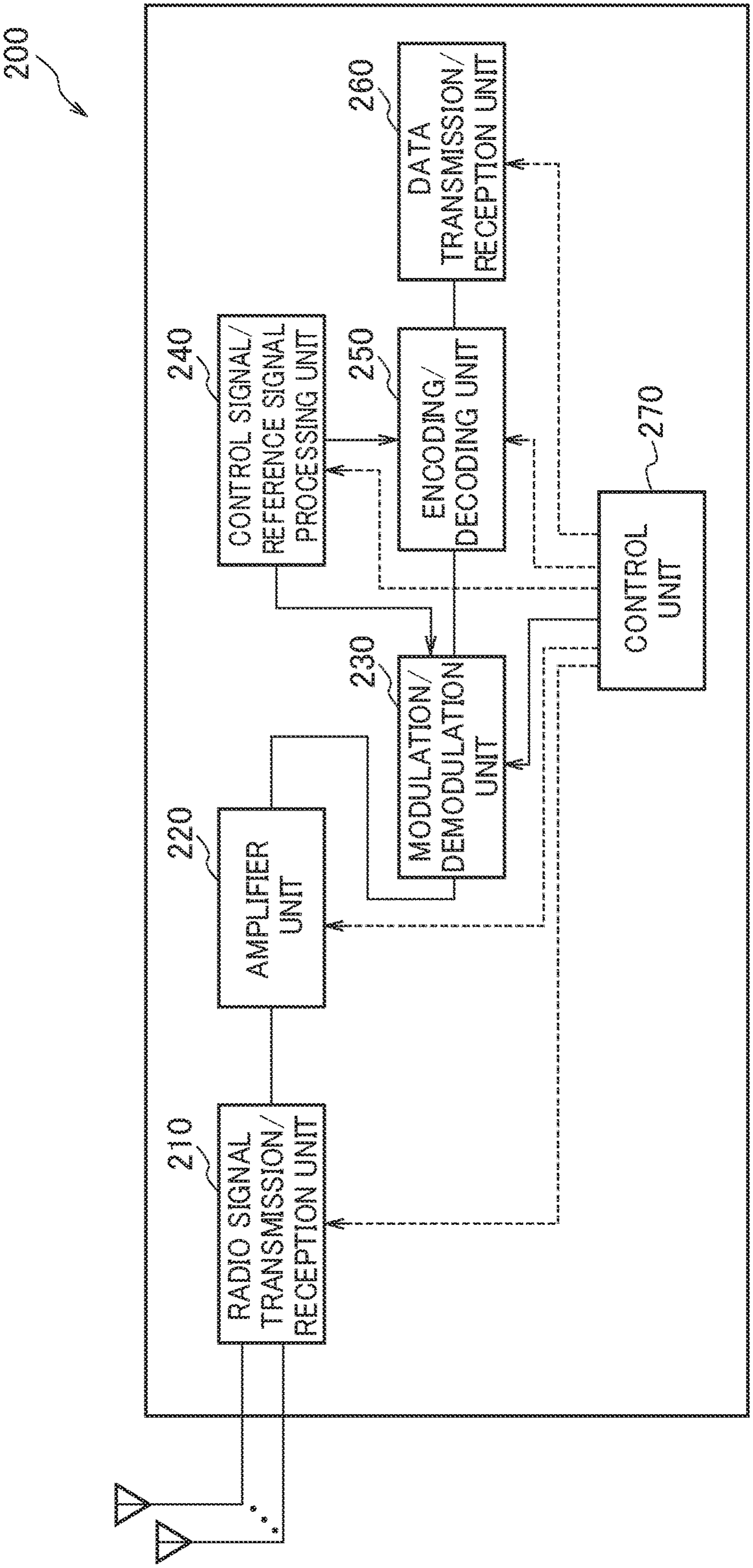
FIG. 4 is a functional block diagram of a user equipment (UE) 200.

FIG. 4 is a functional block diagram of the UE 200. As illustrated in FIG. 4, the UE 200 includes a radio signal transmission/reception unit 210, an amplifier unit 220, a modulation/demodulation unit 230, a control signal/reference signal processing unit 240, an encoding/decoding unit 250, a data transmission/reception unit 260, and a control unit 270.

The radio signal transmission/reception unit 210 transmits and receives a radio signal according to NR. The radio signal transmission/reception unit 210 supports massive MIMO, CA that bundles and uses a plurality of CCs, DC that simultaneously performs communication between the UE and each of two NG-RAN nodes, and the like.

The amplifier unit 220 is configured with a power amplifier (PA), a low noise amplifier (LNA) and the like. The amplifier unit 220 amplifies a signal output from the modulation/demodulation unit 230 to a predetermined power level. In addition, the amplifier unit 220 amplifies a radio frequency (RF) signal output from the radio signal transmission/reception unit 210.

The modulation/demodulation unit 230 executes data modulation/demodulation, transmission power configuration, resource block allocation, and the like, for each predetermined communication destination (gNB 100A or another gNB). In the modulation/demodulation unit 230, cyclic prefix-orthogonal frequency division multiplexing (CP-OFDM)/discrete Fourier transform-spread (DFT-S-OFDM) may be applied. In addition, the DFT-S-OFDM may be used not only in uplink (UL) but also in downlink (DL).

The control signal/reference signal processing unit 240 executes processing regarding various control signals transmitted and received by the UE 200 and processing regarding various reference signals transmitted and received by the UE 200.

Specifically, the control signal/reference signal processing unit 240 receives various control signals transmitted from the gNB 100A via a predetermined control channel, for example, control signals of a radio resource control layer (RRC). In addition, the control signal/reference signal processing unit 240 transmits various control signals to the gNB 100A via a predetermined control channel.

The control signal/reference signal processing unit 240 executes processing using a reference signal (RS) such as a demodulation reference signal (DMRS) and a phase tracking reference signal (PTRS).

The DMRS is a terminal specific known reference signal (pilot signal) between a base station and a terminal for estimating a fading channel used for data demodulation. The PTRS is a terminal specific reference signal for the purpose of estimating phase noise, which is a problem in a high frequency band.

Note that the reference signal may include a channel state information-reference signal (CSI-RS), a sounding reference signal (SRS), a positioning reference signal (PRS) for position information, and the like, in addition to the DMRS and the PTRS.

In addition, the channel includes a control channel and a data channel. The control channel includes a physical downlink control channel (PDCCH), a physical uplink control channel (PUCCH), a random access channel (RACH) (downlink control Information (DCI) including a random access radio network temporary identifier (RA-RNTI)), a physical broadcast channel (PBCH), and the like.

The data channel includes a physical downlink shared channel (PDSCH), a physical uplink shared channel (PUSCH), and the like. The data means data transmitted via the data channel. The data channel may be replaced with a shared channel.

In the present embodiment, the control signal/reference signal processing unit 240 receives downlink control information (DCI) from the network. In the present embodiment, the control signal/reference signal processing unit 240 configures a reception unit.

Specifically, the control signal/reference signal processing unit 240 can receive a plurality of types (formats) of DCI including the scheduling DCI. A format of the DCI may include scheduling of the PUSCH and the PDSCH, a slot format, transmit power control (TPC) commands for the PUCCH and the PUSCH, and the like. More specifically, a DCI format defined in Section 7.3.1 of 3GPP TS38.212 may be targeted.

The encoding/decoding unit 250 executes data division/connection, channel encoding/decoding, and the like for each predetermined communication destination (gNB 100A or another gNB).

Specifically, the encoding/decoding unit 250 divides data output from data transmission/reception unit 260 into a predetermined size, and executes channel encoding for the divided data. In addition, the encoding/decoding unit 250 decodes data output from the modulation/demodulation unit 230 and connects the decoded data to each other.

The data transmission/reception unit 260 executes transmission/reception of a protocol data unit (PDU) and a service data unit (SDU). Specifically, the data transmission/reception unit 260 executes assembling and disassembling of the PDU/SDU in a plurality of layers (a medium access control layer (MAC), a radio link control layer (RLC), a packet data convergence protocol layer (PDCP), and the like). In addition, the data transmission/reception unit 260 executes error correction and retransmission control of data based on a hybrid automatic repeat request (ARQ).

A control unit 270 controls each functional block constituting the UE 200. Particularly, in the present embodiment, the control unit 270 can schedule a plurality of component carriers (CC) using the DCI.

As described above, in the radio communication system 10, the switching of the TCI of the plurality of CCs may be supported via the one downlink control information (DCI). In order to support such switching of the TCI, the control unit 270 may schedule the plurality of CCs using one (single) DCI received via the control signal/reference signal processing unit 240. That is, the control unit 270 can apply information of the TCI indicated by the DCI to the plurality of CCs.

Specifically, the value of the TCI field included in the single DCI may be commonly applied to a plurality of CCs transmitted/received by the radio signal transmission/reception unit 210. The plurality of CCs may be all CCs transmitted and received by the radio signal transmission/reception unit 210 or some of all the CCs may be excluded.

The TCI field can be configured with, for example, three bits. The TCI field may be 0 bit, but in that case, it may be designated by the higher layer parameter (tci-PresentInDCI) whether or not the TCI field exists in the DCI.

Alternatively, the control unit 270 may apply information of the TCI to a group including a plurality of CCs. Specifically, the control unit 270 may apply the TCI included in one (single) DCI to the plurality of CCs in the group.

More specifically, a higher layer may configure a plurality of CCs as a group. Here, the TCI field of the DCI may be commonly applied to the group regardless of the CC scheduled by the DCI.

Note that configuration of a higher layer regarding the group may be the same as that of an "applicable-CC-list" (3GPP Release-16) for indication of a single MAC-control element (CE) for the plurality of CCs.

As described above, the plurality of CCs may be all CCs transmitted/received by the radio signal transmission/reception unit 210, but the following restriction may further be imposed.

For example, the plurality of CCs to which the single DCI is commonly applied may be limited to adjacent (may be called "continuous") CCs within the same frequency band. That is, the plurality of CCs that are targets may be adjacent to each other in the same frequency band. Note that three or more CCs may be targets if they are adjacent (continuous) to each other.

In addition, it is preferable that configuration of the higher layer regarding the TCI is the same for the same ID among the plurality of CCs. Alternatively, the UE 200 may not expect a TCI state to be configured for the plurality of CCs in the group.

(3) Operation of Radio Communication System

Next, an operation of the radio communication system 10 will be described. Specifically, an operation regarding switching of TCI of a plurality of CCs using single DCI will be described.

(3.1) Premise

The radio communication system 10 supports the frequency band (FR2x) exceeding 52.6 GHz and up to 71 GHz, as described above. A high frequency band such as FR2x has essential differences from FR1 and FR2 in the following points.

(Channel/Radio Wave Propagation)

Expansion of usable bandwidth (approximately 13 GHz (in case of 57 to 71 GHz unlicensed))

Low delay spread due to large path-loss caused by non-line of sight (NLOS) (Device (terminal))

(Large-scale (massive) antenna by) Antenna element having small size according to wavelength High directivity (narrow beam width) based on analog beamforming Decrease in efficiency of power amplifier (increase in peak-to-average power ratio (PAPR))

Increase in phase noise (applicability of higher SCS and shorter symbol time)

In addition, the wider the usable bandwidth, the higher the possibility that more CCs will be configured, unless a very wide CC bandwidth is supported. As described above, in a case where a maximum bandwidth of the CC is 400 MHz as in FR2, CCs up to 32 CCs can be arranged in a frequency band of 57 GHz to 71 GHz.

In carrier aggregation (CA), the number of CCs that can be configured is limited. Specifically, in Release-15 and Release-16 of the 3GPP, the maximum number of CCs that can be configured for the UE 200 is sixteen in each of DL and UL (Section 5.4.1 of 3GPP 38.300).

On the other hand, configuration of a physical layer (L1: PHY) and medium access control layer (MAC) is executed for each CC. In Release-15 and Release-16 of the 3GPP, one DCI can schedule only one CC, and thus, a large number of DCI is required to schedule a large number of CCs. Particularly, in cross-carrier scheduling, there is a possibility that a capacity of a PDCCH will be tight.

In addition, one transport block (TB) can be transmitted only by one CC (that is, one TB cannot be mapped to a plurality of CCs), and a large number of hybrid automatic repeat request (HARQ) acknowledgment (ACK) bits are required for a large number of CCs.

Furthermore, beam management (TCI state indication) is also executed for each CC. Specifically, in 3GPP Release-16, one MAC-CE can update/activate TCI states of a plurality of CCs, but one DCI can update only a TCI state of one CC.

Although there is such a restriction, it is assumed that channel characteristics of the plurality of CCs within a single wide band are not different from each other so much, and it is thus assumed that operations in separate PHY and MAC layers for each CC is neither necessarily required nor efficient.

Hereinafter, an operation that realizes efficient scheduling of CCs using DCI even in a case where a large number of CCs are configured in consideration of such a premise will be described.

(3.2) Operation Overview

In the radio communication system 10, in order to achieve a high throughput, an overhead of a control channel of DL is reduced even in a case where a large number of CCs for CA are supported. Particularly, in the radio communication system 10, tightness of a PDCCH capacity at the time of cross-carrier scheduling can be reliably avoided.

Specifically, in the radio communication system 10, the switching of the TCI of the plurality of CCs is supported via one DCI. In order to support such switching of the TCI, the plurality of CCs can be scheduled using one (single) DCI.

In a case where the single DCI schedules the plurality of CCs, the TCI field indicated by the DCI may be commonly applied to the plurality of CCs.

Alternatively, a higher layer may configure a plurality of CCs as a group. Here, the TCI field of the DCI may be commonly applied to the group regardless of the CC already scheduled by the DCI.

In this case, as described above, the configuration of the higher layer regarding the group may be the same as that of the "applicable-CC-list" (3GPP Release-16) for indication of the single MAC-CE for the plurality of CCs.

Note that the plurality of CCs to which the single DCI is commonly applied may be limited to adjacent (may be called "continuous") CCs within the same frequency band. In such a case, one TCI may be commonly applied to the plurality of CCs for any QCL type (A/B/C/D).

The QCL type is defined as follows in section 5.1.5 of 3GPP TS38.214.

QCL-TypeA: {Doppler shift, Doppler spread, average delay, delay spread}

QCL-TypeB: {Doppler shift, Doppler spread}

QCL-TypeC: {Doppler shift, average delay}

QCL-TypeD: {Spatial Rx parameter}

In addition, it is preferable that the configuration of the higher layer regarding the TCI is the same for the same ID among the plurality of component carriers. Alternatively, the UE 200 may not expect a TCI state to be configured for the plurality of CCs in the group.

Figure 5:
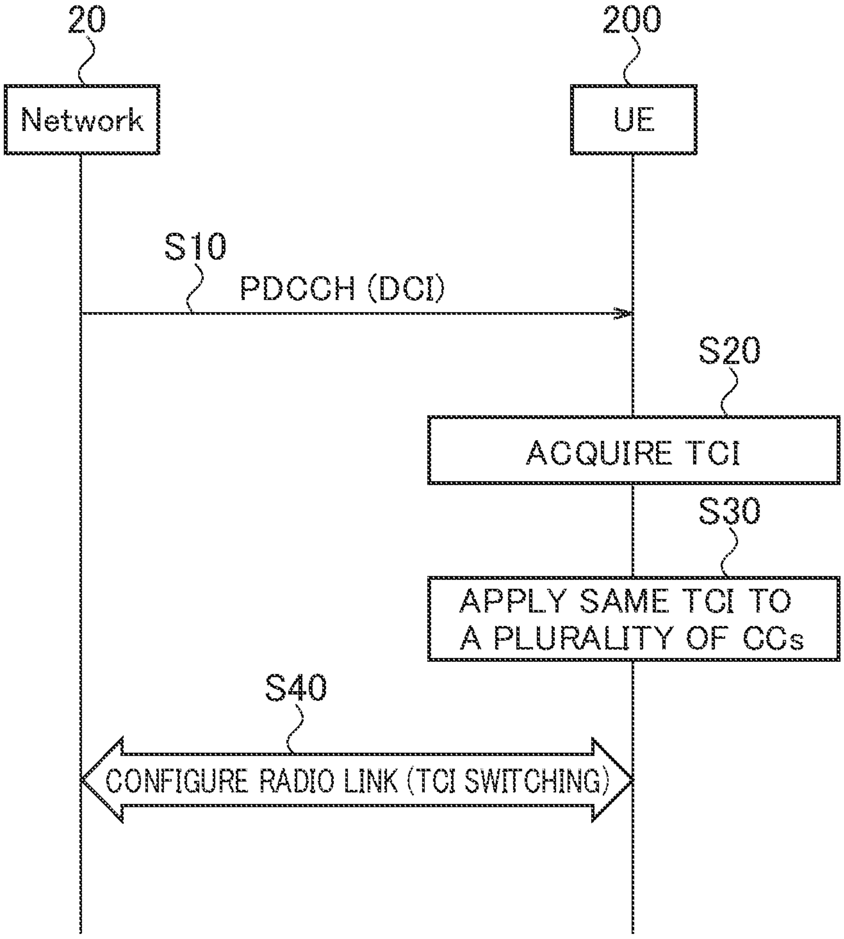
FIG. 5 is a diagram illustrating an example of a communication sequence regarding transmission configuration indication (TCI) switching of a plurality of component carriers (CCs) using single downlink control information (DCI).

FIG. 5 illustrates an example of a communication sequence regarding TCI switching of a plurality of CCs using single DCI according to the present embodiment. Here, it is assumed that the UE 200 has configured a plurality of CCs in order to execute CA.

As illustrated in FIG. 5, the network transmits a PDCCH to the UE 200 (S10). DCI (scheduling DCI) may be included in the PDCCH.

The UE 200 receives the PDCCH and acquires TCI included in the DCI. Specifically, the UE 200 acquires a value of a TCI field included in the DCI (S20).

The UE 200 applies the acquired value of the TCI field to the plurality of CCs that have been configured (S30). Specifically, the UE 200 executes similar TCI switching for the plurality of CCs based on the value of the TCI field.

The UE 200 executes TCI switching, configures a radio link with the network (the gNB 100A or the gNB 100B), and executes radio communication (S40).

Figure 6:
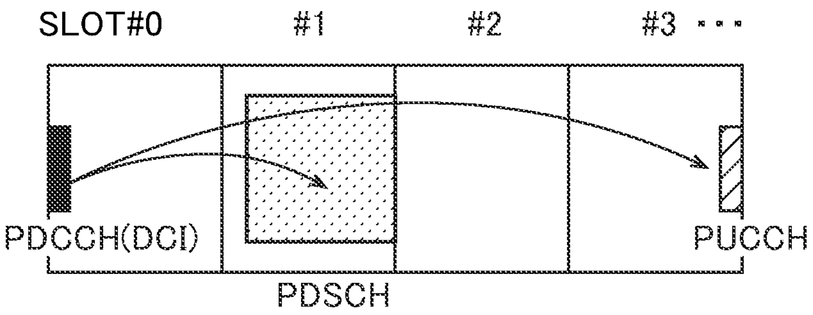
FIG. 6 is a diagram illustrating a configuration example of a control channel and a data channel.

FIG. 6 illustrates a configuration example of a control channel and a data channel. As illustrated in FIG. 6, a PDCCH includes DCI. In the present embodiment, the DCI may include scheduling DCI of a PDSCH or the like.

Figure 7:
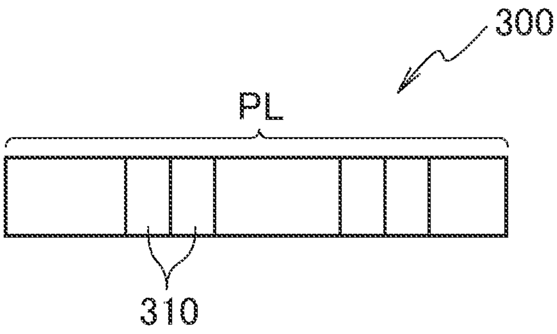
FIG. 7 is a diagram illustrating a schematic configuration of DCI.

FIG. 7 illustrates a schematic configuration of DCI. As illustrated in FIG. 7, a plurality of fields is provided in a payload PL portion of DCI 300. The fields include TCI fields 310 indicating the value of the TCI.

As described above, the TCI field can be configured with three bits, but the number of bits configuring the TCI field is not necessarily limited thereto, and a larger number of bits (that is, the number of TCI states (QCLs) may be used.

(3.3) Operation Example 1

In the present operation example, in a case where single DCI schedules a plurality of CCs, a TCI field indicated by the DCI is commonly applied to the plurality of CCs.

That is, in a case where the single DCI schedules the plurality of CCs, there may be a single TCI field.

With respect to a value of the TCI indicated by the DCI, an operation according to any of the following may be performed.

(Operation example 1-1): The value of the BWP indicator is applied to all CCs configured as a group (some CCs may not be scheduled by DCI).

(Operation example 1-1-1): Configuration of a higher layer regarding a CC group for TCI switching may be the same as that of an "applicable-CC-list" (3GPP Release-16) for indication of a single MAC-CE for a plurality of CCs.

(Operation example 1-1-2): Configuration of a higher layer regarding a CC group for TCI switching is separated from CC groups for other purposes.

Note that even in a case where only one CC is scheduled by the DCI, Operation example 1-1 may be applied.

(Operation example 1-2): The value of the TCI is applied to all CCs scheduled by DCI (that is, TCI states of unscheduled CCs are not updated).

In addition, TCI switching of a plurality of CCs according to single DCI may operate according to any one of the following.

(Operation example 1-a): The value of the BWP indicator is applied only to adjacent CCs within the same frequency band. In this case, one TCI may be commonly applied to the plurality of CCs for any QCL type (A/B/C/D).

(Operation example 1-b): The value of the BWP indicator is applied only to adjacent CCs or non-adjacent CCs within the same frequency band.

(Operation example 1-c): The value of the BWP indicator is applied only to CCs in a frequency range (FR) (for example, a frequency range of 52.6 GHz or higher or 71 GHz or higher).

(Operation example 1-d): The value of the TCI is applied to a plurality of arbitrary CCs as long as they share a Spatial QCL property with each other and are co-located. Sharing the Spatial QCL property with each other may mean that a reference signal (RS) on a CC references an RS on another CC as a QQCL-TypeD source.

Furthermore, TCI switching of a plurality of CCs according to single DCI may operate according to any one of the following.

(Operation example 1-X): Configuration of a higher layer regarding TCI of a plurality of CCs is made the same.

With respect to the same TCI-StateId (see 3GPP TS38.331), each (or both) of qcl-Type 1 and qcl-Type 2 (see 3GPP TS38.331) may reference the exact same RS (for example, an RS on a particular cell) or a plurality of RSs quasi co-located.

(Operation example 1-Y): The UE 200 does not assume that a TCI state is configured for the plurality of CCs in the group.

In addition, with respect to capability of the UE 200 and configuration of RRC, an operation according to any one of the following may be performed.

The UE 200 reports to the network that it supports TCI switching for a plurality of CCs via single DCI (for each UE, FR or band).

The network (gNB) explicitly configures the TCI switching for the plurality of CCs via the single DCI for each cell group (CG) (in CellGroupConfig), each cell (in ServingCellConfig), each BWP, or each search space. Note that the explicit configuration may be performed in a case where grouping the plurality of CCs is commonly applied to such an operation and other operations such as scheduling and HARQ-ACK bundling.

Operation example 1 can suppress an overhead of the DCI as compared with Operation example 2 to be described later. On the other hand, Operation example 1 is lower in flexibility of configuration and switching of the BWP than Operation example 2.

(3.4) Operation Example 2

In the present operation example, in a case where single DCI schedules a plurality of CCs, a separate TCI field indicated by the DCI is applied to each (or a group) of the plurality of CCs.

That is, the DCI scheduling the plurality of CCs may have a plurality of TCI fields. With respect to the number of TCI indicator fields, an operation according to any one of the following may be performed.

(Operation example 2-1): The number of BWP indicator fields is made the same as the number of CCs configured as a group by a higher layer. One TCI field is for one CC.

(Operation example 2-2): The number of BWP indicator fields is made the same as the number of subgroups configured by the higher layer. One TCI field is for one subgroup (that is, one or more CCs).

With respect to TCI switching of a plurality of CCs according to single DCI, operations (limitations) as similar to those (Operation examples 1-a to d) of Operation example 1 may be applied.

In addition, with respect to configuration of TCI states for a plurality of CCs, (Operation example 2-1) may not be particularly limited.

On the other hand, for (Operation example 2-2), TCI state configuration of CCs in a subgroup needs to be the same (as in Operation example 1-X). Alternatively, the UE 200 does not assume that some TCI states are configured as a plurality of CCs in a group (as in Operation example 1-Y).

In addition, with respect to capability of the UE 200 and configuration of RRC, an operation according to any one of the following may be performed.

The UE 200 reports to the network that it supports TCI switching for a plurality of CCs via single DCI (for each UE, FR or band) (similar to Operation example 1). In addition, the UE 200 may also report capability regarding the number of CCs (also subgroups). The UE 200 can support separate TCI switching based on the DCI.

The network (gNB) explicitly configures the TCI switching for the plurality of CCs via the single DCI for each cell group (CG) (in CellGroupConfig), each cell (in ServingCellConfig), each BWP, or each search space (similar to Operation example 1).

Operation example 2 can improve flexibility of configuration and switching of the TCI state as compared with Operation example 1 described above. On the other hand, in Operation example 2, an overhead of the DCI increases as compared with Operation example 1.

(3.5) CC Group

Figure 8:
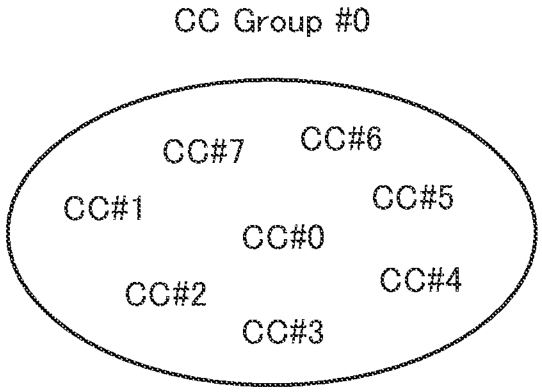
FIG. 8 is a diagram for describing a CC group.
Figure 9:
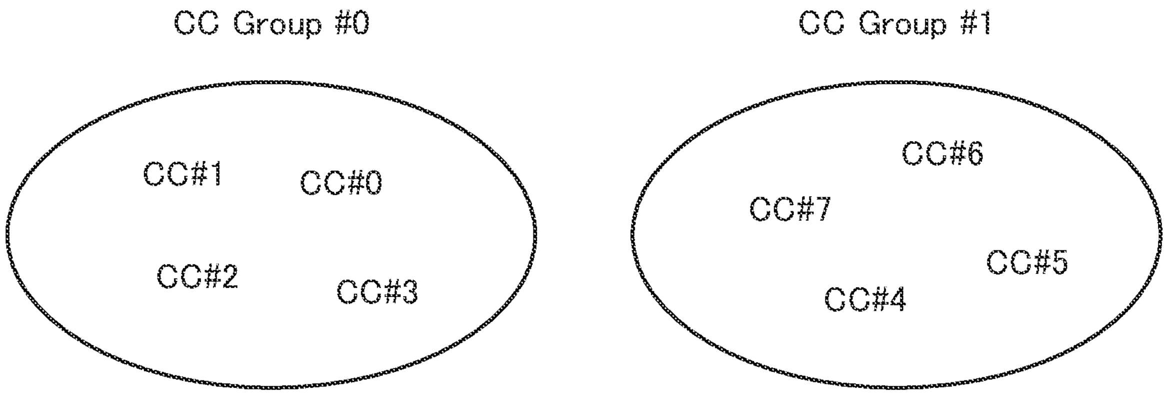
FIG. 9 is a diagram for describing a CC group.

FIGS. 8 and 9 are diagrams for describing a CC group according to the present embodiment. As described above, the CC group includes a plurality of CCs.

As illustrated in FIG. 8, one CC group may be configured. FIG. 8 exemplifies a case where CC #0 to CC #7 are configured in CC group #0. CC group #0 may be referred to as a serving cell group. CC group #0 may be configured by higher layer parameters. For example, CC group #0 may be configured by an RRC message. In the case where one CC group is configured, a plurality of CCs included in the CC group may be predetermined.

As illustrated in FIG. 9, a plurality of CC groups may be configured. FIG. 9 exemplifies a case in which CC #0 to CC #3 are configured in CC group #0 and CC #4 to CC #7 are configured in CC group #1. CC group #0 and CC group #1 may be referred to as serving cell groups. CC group #0 and CC group #1 may be configured by higher layer parameters. For example, CC group #0 and CC group #1 may be configured by an RRC message.

In FIGS. 8 and 9, the CC group may be applied to the UE 200 by an information element included in the RRC message or may be applied to the UE 200 by an information element included in the DCI. The CC group applied to the UE 200 may be a CC group selected from CC groups configured by the higher layer parameters. The application may be referred to as enable or activate.

Similarly, the CC group may not be applied to the UE 200 by the information element included in the RRC message and may not be applied to the UE 200 by the information element included in the DCI. The CC group that is not applied to the UE 200 may be a CC group selected from CC groups configured by the higher layer parameters. The non-application may be referred to as disable or inactivate.

First, the plurality of CCs included in the CC group may be CCs that are consecutive in an intra-band. The plurality of CCs included in the CC group may be CCs included in a scheduling cell or CCs included in a search space of the PDCCH. The search space of the PDCCH may be defined by a radio network temporary identifier (RNTI) such as a system information (SI)-RNTI, a random access (RA)-RNTI, a temporary cell (TC)-RNTI, a cell (C)-RNTI, a paging (P)-RNTI, an interruption (INT)-RNTI, a slot format indication (SFI)-RNTI, a transmit power control (TPC)-PUSCH-RNTI, a TPC-PUCCH-RNTI, a TPC-SRS-RNTI, and a semi persistent (SP)-channel state information (CSI)-RNTI. The plurality of CCs included in the CC group may be CCs to which configuration of the serving cell is commonly applied. The configuration of the serving cell may include TDD DL/UL Configuration and an SCS specific carrier list.

Second, the CC group may be configured and applied for one purpose or operation. The CC group may be configured and applied for two or more purposes or operations. A predetermined purpose or operation may include UL scheduling, DL scheduling, BWP switching, transmission configuration indicator (TCI) switching, and slot format indicator (SFI).

A case where the CC group is configured and applied for one purpose or operation will be described with reference to an example of FIG. 9. For example, CC group #0 may be a group for UL scheduling, and CC group #1 may be a group for DL scheduling. CC group #0 may be a group for scheduling (UL and DL), and CC group #1 may be a group for BWP switching. CC group #0 may be a group for TCI switching, and CC group #1 may be a group for SFI. With such a configuration, it is possible to flexibly configure the CC group, which in turn improves performance.

A case where the CC group is configured and applied for two or more purposes or operations will be described with reference to an example of FIG. 9. For example, CC group #0 may be a group for scheduling (UL and DL) and SFI, and CC group #1 may be a group for BWP switching and TCI switching. With such a configuration, a configuration of the gNB can be simplified.

(4) Action and Effect

According to the embodiment described above, the following actions and effects can be obtained. Specifically, the UE 200 can schedule the plurality of CCs using the DCI, and can apply the information of the TCI indicated by the DCI to the plurality of CCs. That is, the information of the TCI indicated by the single DCI can be commonly applied to the plurality of CCs.

For this reason, even in a case where a large number of CCs are configured, such as a case of using FR2x, efficient scheduling of the CCs using the DCI, specifically, TCI switching can be realized.

In the present embodiment, the UE 200 can apply the information of the TCI to the group including the plurality of CCs. For this reason, for example, the similar TCI switching can be collectively applied to a plurality of CCs included in groups having different purposes.

In the present embodiment, the plurality of CCs that are targets may be limited to adjacent CCs in the same frequency band. For this reason, the information of the TCI can be commonly applied to CCs that are assumed to have relatively similar characteristics. Therefore, it is possible to achieve both of efficient scheduling of the CCs using the DCI and maintenance and improvement of radio quality.

In the present embodiment, the configuration of the higher layer regarding the TCI can be made the same in the plurality of CCs that are targets. For this reason, TCI switching can be applied to CCs whose TCI state (QCL type) or the like is common.

(5) Other Embodiments

Although the embodiment has been described hereinabove, it is obvious to those skilled in the art that the present disclosure is not limited to the description of the embodiment, and can be variously modified and improved.

For example, in the embodiment described above, the use of the high frequency band such as FR2x has been premised, but the use of such a high frequency band is not always necessary. That is, even in a case where FR1 or FR2 is used, the information of the BWP indicated by the single DCI as described above may be commonly applied to the plurality of CCs.

In addition, the plurality of CCs may be divided into a primary component carrier (PCC), a secondary component carrier (SCC), and the like and be scheduled.

Moreover, the block diagram used for describing the embodiments (FIG. 4) illustrates blocks of functional unit. Those functional blocks (structural components) can be realized by a desired combination of at least one of hardware and software. Means for realizing each functional block is not particularly limited. That is, each functional block may be realized by one device combined physically or logically.

Alternatively, two or more devices separated physically or logically may be directly or indirectly connected (for example, wired, or wireless) to each other, and each functional block may be realized by these plural devices. The functional blocks may be realized by combining software with the one device or the plural devices described above.

Functions include judging, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating (mapping), assigning, and the like. However, the functions are not limited thereto. For example, a functional block (structural component) that causes transmitting may be called a transmitting unit or a transmitter. For any of the above, as described above, the realization method is not particularly limited to any one method.

Figure 10:
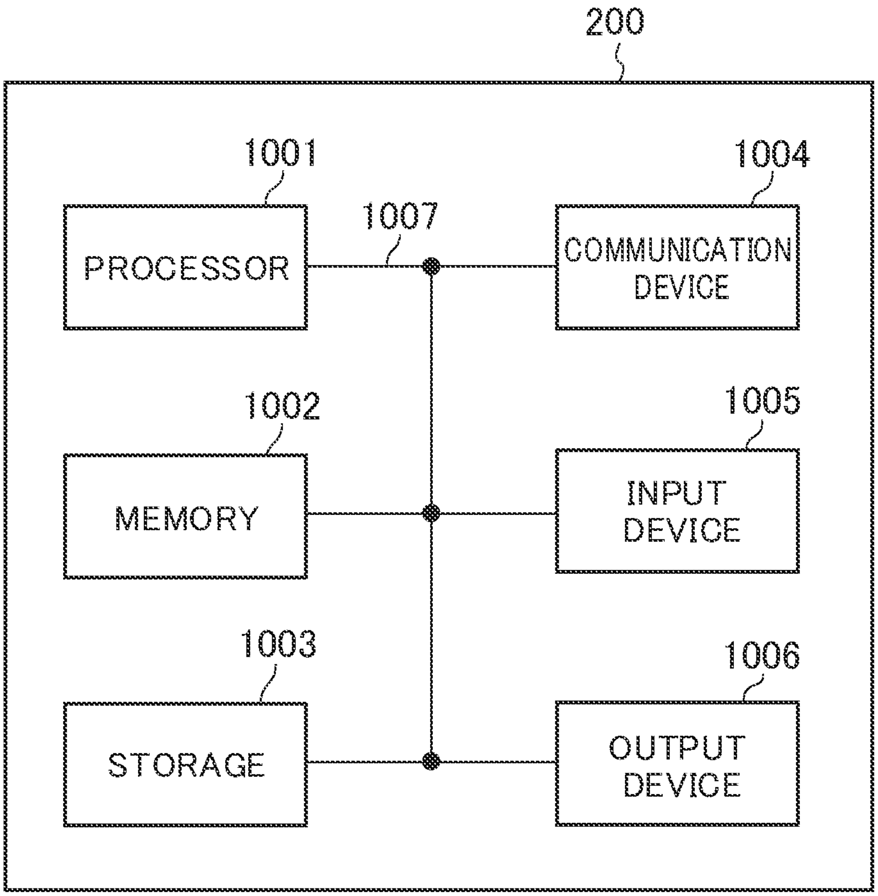
FIG. 10 is a diagram illustrating an example of a hardware configuration of the UE 200.

Furthermore, the UE 200 described above can function as a computer that performs the processing of the radio communication method of the present disclosure. FIG. 10 is a diagram illustrating an example of a hardware configuration of the UE 200. As illustrated in FIG. 10, the UE 200 can be configured as a computer device including a processor 1001, a memory 1002, a storage 1003, a communication device 1004, an input device 1005, an output device 1006, a bus 1007, and the like.

Furthermore, in the following explanation, the term "device" can be replaced with a circuit, device, unit, and the like. Hardware configuration of the device can be constituted by including one or plurality of the devices illustrated in the figure, or can be constituted by without including a part of the devices.

The functional blocks (see FIG. 4) of the UE 200 can be realized by any of hardware elements of the computer device or a desired combination of the hardware elements.

Moreover, the processor 1001 performs operation by loading a predetermined software (program) on hardware such as the processor 1001 and the memory 1002, and realizes various functions of the UE 200 by controlling communication via the communication device 1004, and controlling reading and/or writing of data on the memory 1002 and the storage 1003.

The processor 1001, for example, operates an operating system to control the entire computer. The processor 1001 can be configured with a central processing unit (CPU) including an interface with a peripheral device, a control device, an operation device, a register, and the like.

Moreover, the processor 1001 reads a program (program code), a software module, data, and the like from the storage 1003 and/or the communication device 1004 into the memory 1002, and executes various types of processing according to the data. As the program, a program that is capable of executing on the computer at least a part of the operation described in the above embodiments is used. Alternatively, various types of processing described above can be executed by one processor 1001 or can be executed simultaneously or sequentially by two or more processors 1001. The processor 1001 can be implemented by using one or more chips. Alternatively, the program can be transmitted from a network via a telecommunication line.

The memory 1002 is a computer readable recording medium and is configured, for example, with at least one of Read Only Memory (ROM), Erasable Programmable ROM (EPROM), Electrically Erasable Programmable ROM (EEPROM), Random Access Memory (RAM), and the like. The memory 1002 can be called register, cache, main memory (main memory), and the like. The memory 1002 can store therein a program (program codes), software modules, and the like that can execute the method according to the embodiment of the present disclosure.

The storage 1003 is a computer readable recording medium. Examples of the storage 1003 include an optical disk such as Compact Disc ROM (CD-ROM), a hard disk drive, a flexible disk, a magneto-optical disk (for example, a compact disk, a digital versatile disk, Blu-ray (Registered Trademark) disk), a smart card, a flash memory (for example, a card, a stick, a key drive), a floppy (Registered Trademark) disk, a magnetic strip, and the like. The storage 1003 can be called an auxiliary storage device. The recording medium can be, for example, a database including the memory 1002 and/or the storage 1003, a server, or other appropriate medium.

The communication device 1004 is hardware (transmission/reception device) capable of performing communication between computers via a wired and/or wireless network. The communication device 1004 is also called, for example, a network device, a network controller, a network card, a communication module, and the like.

The communication device 1004 includes a high-frequency switch, a duplexer, a filter, a frequency synthesizer, and the like in order to realize, for example, at least one of Frequency Division Duplex (FDD) and Time Division Duplex (TDD).

The input device 1005 is an input device (for example, a keyboard, a mouse, a microphone, a switch, a button, a sensor, and the like) that accepts input from the outside. The output device 1006 is an output device (for example, a display, a speaker, an LED lamp, and the like) that outputs data to the outside. Note that, the input device 1005 and the output device 1006 may be integrated (for example, a touch screen).

In addition, the respective devices, such as the processor 1001 and the memory 1002, are connected to each other with the bus 1007 for communicating information thereamong. The bus 1007 can be constituted by a single bus or can be constituted by separate buses between the devices.

Further, the device is configured to include hardware such as a microprocessor, a digital signal processor (Digital Signal Processor: DSP), Application Specific Integrated Circuit (ASIC), Programmable Logic Device (PLD), and Field Programmable Gate Array (FPGA). Some or all of these functional blocks may be realized by the hardware. For example, the processor 1001 may be implemented by using at least one of these types of hardware.

Notification of information is not limited to that described in the aspect/embodiment in the present disclosure, and may be performed by using a different method. For example, the notification of information may be performed by physical layer signaling (for example, Downlink Control Information (DCI), Uplink Control Information (UCI), higher layer signaling (for example, RRC signaling, Medium Access Control (MAC) signaling, broadcast information (Master Information Block (MIB), System Information Block (SIB)), other signals, or a combination of these. The RRC signaling may be called RRC message, for example, or can be RRC Connection Setup message, RRC Connection Reconfiguration message, or the like.

Each of the aspects/embodiments described in the present disclosure can be applied to at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), New Radio (NR), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), a system using any other appropriate system, and a next-generation system that is expanded based on these. Further, a plurality of systems may be combined (for example, a combination of at least one of the LTE and the LTE-A with the 5G).

As long as there is no inconsistency, the order of processing procedures, sequences, flowcharts, and the like of each of the aspects/embodiments described in the present disclosure may be exchanged. For example, the various steps and the sequence of the steps of the methods described in the present disclosure are exemplary and are not limited to the specific order described above.

The specific operation that is performed by the base station in the present disclosure may be performed by its upper node in some cases. In a network constituted by one or more network nodes having a base station, the various operations performed for communication with the terminal may be performed by at least one of the base station and other network nodes other than the base station (for example, MME, S-GW, and the like may be considered, but not limited thereto). In the above, an example in which there is one network node other than the base station is described; however, a combination of a plurality of other network nodes (for example, MME and S-GW) may be used.

Information and signals (information and the like) can be output from a higher layer (or lower layer) to a lower layer (or higher layer). It may be input and output via a plurality of network nodes.

The input/output information can be stored in a specific location (for example, a memory) or can be managed in a management table. The information to be input/output can be overwritten, updated, or added. The information can be deleted after outputting. The inputted information can be transmitted to another device.

The determination may be made by a value (0 or 1) represented by one bit or by Boolean value (Boolean: true or false), or by comparison of numerical values (for example, comparison with a predetermined value).

Each aspect/embodiment described in the present disclosure may be used separately or in combination, or may be switched in accordance with the execution. In addition, notification of predetermined information (for example, notification of "being X") is not limited to being performed explicitly, it may be performed implicitly (for example, without notifying the predetermined information).

Instead of being referred to as software, firmware, middleware, microcode, hardware description language, or some other name, software should be interpreted broadly to mean instruction, instruction set, code, code segment, program code, program, subprogram, software module, application, software application, software package, routine, subroutine, object, executable file, execution thread, procedure, function, and the like.

Further, software, instruction, information, and the like may be transmitted and received via a transmission medium. For example, when a software is transmitted from a website, a server, or some other remote source by using at least one of a wired technology (coaxial cable, optical fiber cable, twisted pair, Digital Subscriber Line (DSL), or the like) and a wireless technology (infrared light, microwave, or the like), then at least one of these wired and wireless technologies is included within the definition of the transmission medium.

Information, signals, or the like described in the present disclosure may be represented by using any of a variety of different technologies. For example, data, instruction, command, information, signal, bit, symbol, chip, or the like that may be mentioned throughout the above description may be represented by voltage, current, electromagnetic wave, magnetic field or magnetic particle, optical field or photons, or a desired combination thereof.

It should be noted that the terms described in the present disclosure and terms necessary for understanding the present disclosure may be replaced by terms having the same or similar meanings. For example, at least one of a channel and a symbol may be a signal (signaling). Also, a signal may be a message. Further, a component carrier (Component Carrier: CC) may be referred to as a carrier frequency, a cell, a frequency carrier, or the like.

The terms "system" and "network" used in the present disclosure can be used interchangeably.

Furthermore, the information, the parameter, and the like described in the present disclosure can be represented by an absolute value, can be expressed as a relative value from a predetermined value, or can be represented by corresponding other information. For example, the radio resource can be indicated by an index.

The name used for the above parameter is not a restrictive name in any respect. In addition, formulas and the like using these parameters may be different from those explicitly disclosed in the present disclosure. Because the various channels (for example, PUCCH, PDCCH, or the like) and information element can be identified by any suitable name, the various names assigned to these various channels and information elements shall not be restricted in any way.

In the present disclosure, it is assumed that "base station (Base Station: BS)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to with the terms such as a macro cell, a small cell, a femtocell, or a pico cell.

The base station can accommodate one or more (for example, three) cells (also called sectors). In a configuration in which the base station accommodates a plurality of cells, the entire coverage area of the base station can be divided into a plurality of smaller areas. In each such a smaller area, communication service can be provided by a base station subsystem (for example, a small base station for indoor use (Remote Radio Head: RRH)).

The term "cell" or "sector" refers to a part or all of the coverage area of a base station and/or a base station subsystem that performs communication service in this coverage.

In the present disclosure, the terms "mobile station (Mobile Station: MS)", "user terminal", "user equipment (User Equipment: UE)", "terminal" and the like can be used interchangeably.

The mobile station is called by the persons skilled in the art as a subscriber station, a mobile unit, a subscriber unit, a radio unit, a remote unit, a mobile device, a radio device, a radio communication device, a remote device, a mobile subscriber station, an access terminal, a mobile terminal, a radio terminal, a remote terminal, a handset, a user agent, a mobile client, a client, or with some other suitable term.

At least one of a base station and a mobile station may be called a transmitting device, a receiving device, a communication device, or the like. Note that, at least one of a base station and a mobile station may be a device mounted on a moving body, a moving body itself, or the like. The moving body may be a vehicle (for example, a car, an airplane, or the like), a moving body that moves unmanned (for example, a drone, an automatically driven vehicle, or the like), a robot (manned type or unmanned type). At least one of a base station and a mobile station can be a device that does not necessarily move during the communication operation. For example, at least one of a base station and a mobile station may be an Internet of Things (IoT) device such as a sensor.

Also, a base station in the present disclosure may be read as a mobile station (user terminal, hereinafter the same). For example, each of the aspects/embodiments of the present disclosure may be applied to a configuration that allows a communication between a base station and a mobile station to be replaced with a communication between a plurality of mobile stations (for example, may be referred to as Device-to-Device (D2D), Vehicle-to-Everything (V2X), or the like). In this case, the mobile station may have the function of the base station. Words such as "uplink" and "downlink" may also be replaced with wording corresponding to inter-terminal communication (for example, "side"). For example, terms an uplink channel, a downlink channel, or the like may be read as a side channel.

Likewise, a mobile station in the present disclosure may be read as a base station. In this case, the base station may have the function of the mobile station.

A radio frame may be configured with one or a plurality of frames in a time domain. One frame or each of the plurality of frames in the time domain may be called a subframe. The subframe may also be configured with one or a plurality of slots in the time domain. The subframe may have a fixed time length (for example, 1 ms) that does not depend on a numerology.

The numerology may be a communication parameter applied to at least one of transmission and reception of a certain signal or channel. The numerology may indicate at least one of, for example, a subcarrier spacing (SCS), a bandwidth, a symbol length, a cyclic prefix length, a transmission time interval (TTI), the number of symbols per TTI, a radio frame configuration, specific filtering processing performed by a transceiver in a frequency domain, a specific windowing processing performed by the transceiver in the time domain, and the like.

The slot may be configured with one or a plurality of symbols (Orthogonal Frequency Division Multiplexing (OFDM) symbols, Single Carrier Frequency Division Multiple Access (SC-FDMA) symbols, or the like) in the time domain. The slot may be a time unit based on a numerology.

The slot may include a plurality of minislots. Each minislot may be configured with one or a plurality of symbols in the time domain. In addition, the minislot may be called a subslot. The minislot may be configured with a smaller number of symbols than that of the slot. A PDSCH (or PUSCH) transmitted in a time unit larger than the minislot may be called PDSCH (or PUSCH) mapping type A. A PDSCH (or PUSCH) transmitted using the minislot may be called PDSCH (or PUSCH) mapping type B.

All of the radio frame, the subframe, the slot, the minislot, and the symbol represent time units at the time of transmitting a signal. The radio frame, the subframe, the slot, the minislot, and the symbol may have different names corresponding thereto, respectively.

For example, one subframe may be called a transmission time interval (TTI), a plurality of consecutive subframes may be called a TTI, and one slot or one minislot may be called a TTI. That is, at least one of the subframe and the TTI may be a subframe (1 ms) in the existing LTE, may be a period (for example, one to thirteen symbols) shorter than 1 ms, or may be a period longer than 1 ms. Note that a unit representing the TTI may be called a slot, a minislot, or the like rather than the subframe.

Here, the TTI refers to, for example, a minimum time unit of scheduling in radio communication. For example, in an LTE system, a base station performs scheduling that allocates radio resources (frequency bandwidths, transmission power, and the like, that can be used in each user terminal) to each user terminal in a unit of the TTI. Note that a definition of the TTI is not limited thereto.

The TTI may be a transmission time unit of a channel-encoded data packet (transport block), a code block, a codeword, or the like, or may be a processing unit such as scheduling, link adaptation, or the like. Note that when the TTI is given, a time section (for example, the number of symbols) in which the transport block, the code block, the codeword, or the like is actually mapped may be shorter than the TTI.

Note that in a case where one slot or one minislot is called the TTI, one or more TTIs (that is, one or more slots or one or more minislots) may be a minimum time unit of scheduling. In addition, the number of slots (number of minislots) constituting the minimum time unit of the scheduling may be controlled.

A TTI having a time length of 1 ms may be called a normal TTI (TTI in LTE Rel. 8-12), a normal TTI, a long TTI, a normal subframe, a normal subframe, a long subframe, a slot, and the like. A TTI shorter than the normal TTI may be called a shortened TTI, a short TTI, a partial or fractional TTI, a shortened subframe, a short subframe, a minislot, a subslot, a slot, and the like.

Note that the long TTI (for example, a normal TTI, a subframe or the like) may be replaced with a TTI having a time length exceeding 1 ms and the short TTI (for example, a shortened TTI or the like) may be replaced with a TTI having a TTI length shorter than that of the long TTI and having a TTI length of 1 ms or more.

A resource block (RB) is a resource allocation unit in the time domain and the frequency domain, and may include one or a plurality of continuous subcarriers in the frequency domain. The number of subcarriers included in the RB may be the same regardless of the numerology, and may be, for example, 12. The number of subcarriers included in the RB may be determined based on the numerology.

In addition, the time domain of the RB may include one or a plurality of symbols, and may have a length of one slot, one minislot, one subframe, or one TTI. One TTI, one subframe, and the like, may each be configured with one or a plurality of resource blocks.

Note that one or a plurality of RBs may be called a physical resource block (Physical RB: PRB), a subcarrier group (Sub-Carrier Group: SCG), a resource element group (Resource Element Group: REG), a PRB pair, an RB pair, and the like.

In addition, the resource block may be configured with one or a plurality of resource elements (Resource Elements: RE). For example, one RE may be a radio resource area of one subcarrier and one symbol.

A bandwidth part (Bandwidth Part: BWP) (which may be called a partial bandwidth or the like) may represent a subset of contiguous common resource blocks (RBs) for a certain numerology in a certain carrier. Here, the common RB may be specified by an index of RBs based on a common reference point of the carrier. The PRB may be defined in a certain BWP and be numbered within the BWP.

The BWP may include an UL BWP and a DL BWP. For the UE, one or a plurality of BWPs may be configured in one carrier.

At least one of the configured BWPs may be active, and it may not be assumed that the UE transmits and receives a predetermined signal/channel outside the active BWP. Note that a "cell", a "carrier", or the like in the present disclosure may be replaced with the "BWP".

The structures of the radio frame, the subframe, the slot, the minislot, the symbol, and the like, described above are merely examples. For example, a configuration such as the number of subframes included in the radio frame, the number of slots per subframe or radio frame, the number of minislots included in the slot, the number of symbols and RBs included in the slot or the minislot, the number of subcarriers included in the RB, the number of symbols in the TTI, the symbol length, and the cyclic prefix (CP) length can be variously changed.

The terms "connected", "coupled", or any variations thereof, mean any direct or indirect connection or coupling between two or more elements. Also, one or more intermediate elements may be present between two elements that are "connected" or "coupled" to each other. The coupling or connection between the elements may be physical, logical, or a combination thereof. For example, "connection" may be read as "access". In the present disclosure, two elements can be "connected" or "coupled" to each other by using one or more wires, cables, printed electrical connections, and as some non-limiting and non-exhaustive examples, by using electromagnetic energy having wavelengths in the radio frequency domain, the microwave region and light (both visible and invisible) regions, and the like.

The reference signal may be abbreviated as Reference Signal (RS) and may be called pilot (Pilot) according to applicable standards.

As used in the present disclosure, the phrase "based on" does not mean "based only on" unless explicitly stated otherwise. In other words, the phrase "based on" means both "based only on" and "based at least on".

The "means" in the configuration of each of the above devices may be replaced with a "unit", a "circuit" a, "device", and the like.

Any reference to an element using a designation such as "first", "second", and the like used in the present disclosure generally does not limit the amount or order of those elements. Such designations can be used in the present disclosure as a convenient way to distinguish between two or more elements. Thus, the reference to the first and second elements does not imply that only two elements can be adopted, or that the first element must precede the second element in some or the other manner.

In the present disclosure, the used terms "include", "including", and variants thereof are intended to be inclusive in a manner similar to the term "comprising". Furthermore, the term "or" used in the present disclosure is intended not to be an exclusive disjunction.

Throughout the present disclosure, for example, during translation, if articles such as "a", "an", and "the" in English are added, in the present disclosure, these articles shall include plurality of nouns following these articles.

The terms "determining" as used in the present disclosure may encompass a wide variety of operations. The "determining" can include, for example, considering performing judging, calculating, computing, processing, deriving, investigating, looking up, search, or inquiry (for example, searching in a table, a database, or another data structure), or ascertaining as performing the "determining". In addition, the "determining" can include considering performing receiving (for example, receiving information), transmitting (for example, transmitting information), input, output, or accessing (for example, accessing data in a memory) as performing the "determining". In addition, the "determining" can include considering performing resolving, selecting, choosing, establishing, or comparing as performing the "determining". That is, the "determining" can include considering some operation as performing the "determining". In addition, the "determining" may be replaced with "assuming", "expecting", "considering", and the like.

In the present disclosure, the term "A and B are different" may mean "A and B are different from each other". It should be noted that the term may mean "A and B are each different from C". Terms such as "leave", "coupled", or the like may also be interpreted in the same manner as "different".

Although the present disclosure has been described in detail above, it will be obvious to those skilled in the art that the present disclosure is not limited to the embodiments described in the present disclosure. The present disclosure can be implemented as modifications and variations without departing from the spirit and scope of the present disclosure as defined by the claims. Therefore, the description of the present disclosure is for the purpose of illustration, and does not have any restrictive meaning to the present disclosure.

REFERENCE SIGNS LIST

10 Radio communication system
20 NG-RAN
100A, 100B gNB
UE 200
210 Radio signal transmission/reception unit
220 Amplifier unit
230 Modulation/demodulation unit
240 Control signal/reference signal processing unit
250 Encoding/decoding unit
260 Data transmission/reception unit
270 Control unit
300 DCI
310 TCI field
BM beam
1001 Processor
1002 Memory
1003 Storage
1004 Communication device
1005 Input device
1006 Output device
1007 Bus

The invention claimed is:

1. A terminal comprising:

a receiver that receives downlink control information from a network; and a processor that applies a state of transmission configuration indication indicated by the downlink control information to a plurality of component carriers, based on a configuration of a higher layer, wherein the processor does not assume that the state of the transmission configuration indication is configured for a plurality of component carriers in a band, wherein the processor applies the state of the transmission configuration indication to the plurality of component carriers within same frequency band, wherein the transmission configuration indication corresponds to a transmission configuration state defining a quasi-co-location relationship for demodulation of a downlink channel, and wherein the plurality of component carriers share a common Spatial quasi-co-location (QCL) property, and a reference signal on one of the component carriers serves as a QCL-Type D source for reference signals on the other component carriers.

2. A radio communication method for a terminal, comprising:

a step of receiving downlink control information from a network; and a step of applying a state of transmission configuration indication indicated by the downlink control information to a plurality of component carriers, based on a configuration of a higher layer, wherein in the step of applying, it is not assumed that the state of the transmission configuration indication is configured for a plurality of component carriers in a band, wherein in the step of applying, the state of the transmission configuration indication is applied to the plurality of component carriers within same frequency band, wherein the transmission configuration indication corresponds to a transmission configuration state defining a quasi-co-location relationship for demodulation of a downlink channel, and wherein the plurality of component carriers share a common Spatial quasi-co-location (QCL) property, and a reference signal on one of the component carriers serves as a QCL-Type D source for reference signals on the other component carriers.

3. A communication system comprising:

a base station and a terminal, wherein the base station includes a transmitter that transmits downlink control information indicating transmission configuration indication, the terminal includes:

a receiver that receives the downlink control information; and a processor that applies a state of the transmission configuration indication indicated by the downlink control information to a plurality of component carriers, based on a configuration of a higher layer, and the processor does not assume that the state of the transmission configuration indication is configured for a plurality of component carriers in a band, wherein the processor applies the state of the transmission configuration indication to the plurality of component carriers within same frequency band, wherein the transmission configuration indication corresponds to a transmission configuration state defining a quasi-co-location relationship for demodulation of a downlink channel, and wherein the plurality of component carriers share a common Spatial quasi-co-location (QCL) property, and a reference signal on one of the component carriers serves as a QCL-Type D source for reference signals on the other component carriers.

* * * * *